United States Patent [19]
Yeomans

[11] Patent Number: 5,196,922
[45] Date of Patent: Mar. 23, 1993

[54] DIGITAL IMAGE GENERATION

[75] Inventor: James V. Yeomans, Hertfordshire, England

[73] Assignee: Crosfield Electronics Ltd., England

[21] Appl. No.: 625,389

[22] Filed: Dec. 11, 1990

[30] Foreign Application Priority Data

Dec. 12, 1989 [GB] United Kingdom ............... 8928058

[51] Int. Cl.$^5$ .............................................. H04N 9/74
[52] U.S. Cl. ..................................... 358/22; 358/450; 395/135
[58] Field of Search ............... 358/22, 450, 453, 75; 395/133, 134, 135

[56] References Cited

U.S. PATENT DOCUMENTS

| | | | |
|---|---|---|---|
| 4,292,649 | 9/1981 | Macheboeuf | 358/22 |
| 4,533,937 | 8/1985 | Yamamoto et al. | 358/22 |
| 4,621,280 | 11/1986 | Shinohara et al. | 358/22 |
| 5,003,491 | 3/1991 | Heckt | 395/135 |

FOREIGN PATENT DOCUMENTS

| | | |
|---|---|---|
| 0070174 | 1/1983 | European Pat. Off. . |
| 0171829 | 2/1986 | European Pat. Off. . |
| 0235902 | 9/1987 | European Pat. Off. . |
| 0307948 | 3/1989 | European Pat. Off. . |

Primary Examiner—Leo H. Boudreau
Assistant Examiner—Steven P. Klocinski
Attorney, Agent, or Firm—Sughrue, Mion, Zinn, Macpeak & Seas

[57] ABSTRACT

A method of generating a representation of a subsidiary colored image initially contained within a color content of pixels of the image comprises defining a control data array. This control data array (9) defines, for at least those pixels in the image corresponding to the region containing the subsidiary image, the proportion of the image pixel color which is due to the subsidiary image. The average color in regions of the image different from the subsidiary image region is then determined. The inverse of the control data array is multiplied by the determined average color to generate a background image (13) which is subtracted (14) from the corresponding region of the original image so as to generate the representation of the subsidiary image.

4 Claims, 2 Drawing Sheets

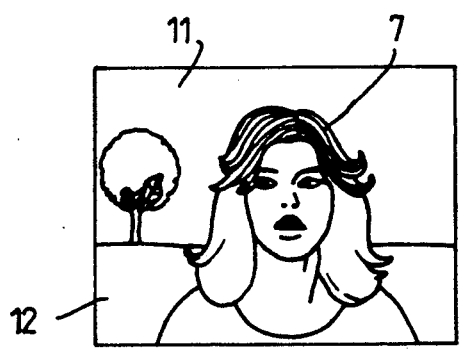
Fig.3.
Fig.4.
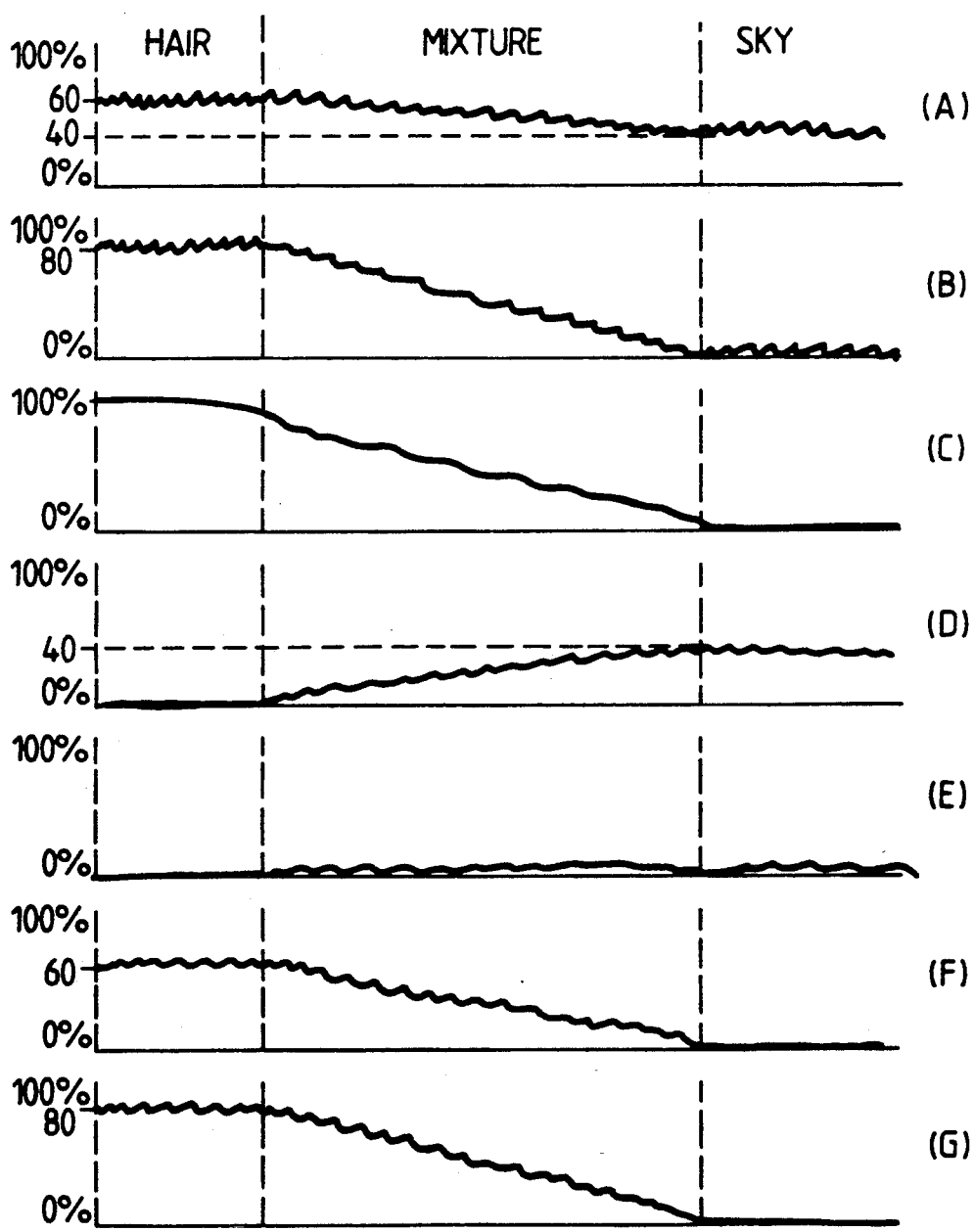

DIGITAL IMAGE GENERATION

FIELD OF THE INVENTION

The invention relates to methods and apparatus for generating a representation of a subsidiary coloured image initially contained within a larger image represented by digital data defining the colour content of pixels of the image.

DESCRIPTION OF THE PRIOR ART

In the field of digital image processing, there is a common requirement to be able to extract a feature from an image so that the feature can be printed by itself or possibly introduced into another image. For example, an original image may have a foreground feature which it is desired to extract from the surrounding background. This is conventionally achieved by generating an array of control data or mask which matches the original image pixel by pixel, each pixel of the control data array defining whether the corresponding pixel in the original image is to be selected or not. More recently, it has been proposed to make use of so-called "soft" masks in which each pixel in the control data array defines the proportion of the corresponding image colour which is to be selected. However, even with this recent improvement, certain subsidiary images are difficult to extract. For example, in the case of a subsidiary image having very fine detail (such as human hair) there will be small regions of background intermixed with the fine detail which up to now could not be eliminated.

EP-A-0070174 describes a digital chroma-key apparatus for improving the correspondence of the keying signal with desired boundary between an object and the background. A background colour is modulated by a keying signal which has been derived by comparing a foreground colour video data signal with the background colour data signal and then processed to adjust the timing or compensate the level of the digital key signal.

SUMMARY OF THE INVENTION

In accordance with one aspect of the present invention, a method of generating a representation of a subsidiary coloured image initially contained within a larger image represented by digital data defining the colour content of pixels of the image comprises defining a control data array which defines for at least those pixels in the image corresponding to the region containing the subsidiary image the proportion of the image pixel colour which is due to the subsidiary image; determining the average colour in regions of the image different from the subsidiary image region; multiplying the inverse of the control data array by the determined average colour to generate a background image; and subtracting the background image from the corresponding region of the original image so as to generate the representation of the subsidiary image.

In accordance with a second aspect of the present invention, apparatus for generating a representation of a subsidiary coloured image initially contained within a larger image represented by digital data defining the colour content of pixels of the image comprises first means for generating and storing a control data array which defines for at least those pixels in the image corresponding to the region containing the subsidiary image the proportion of the image pixel colour which is due to the subsidiary image; second means for determining the average colour in regions of the image different from the subsidiary image region; multiplying means for multiplying the inverse of the control data array by the determined average colour to generate a background image; and subtraction means for subtracting the background image from the corresponding region of the original image so as to generate the representation of the subsidiary image.

We have realized that it can generally be assumed that in those areas of the subsidiary image to be extracted corresponding to "soft" areas of the mask or control data array, the actual original image colour is equal to:

(wanted area colour)*(Soft mask value (density))+(unwanted colour)*(1−soft mask value (density))

The method then determines (Original image colour)−(Average unwanted colour) * (1−soft mask density)

which is approximately:

(wanted area colour) * (Soft mask density)

Consequently, the unwanted colour has been removed.

In the simplest case, the invention enables a foreground feature to be extracted from an image having a single background colour. More commonly, however, there may be a series of different background colours so that a corresponding number of average colours are determined and corresponding areas of the inverse of the control data array are multiplied by the respective average colour.

The invention is particularly applicable to extracting a subsidiary image and then inserting that subsidiary image into another image. In one example, this can be achieved by multiplying data defining the colour content of pixels of another image by the inverse of the control data array and thereafter combining the representation of the subsidiary image.

The combining step may comprise a simple addition although in practice a more complex blending may be necessary so as to ensure that the join between the new image and the subsidiary image is "seamless". It may also be necessary to compute image noise distributions in the two images and add noise as appropriate again to ensure a seamless join. For example, unwanted noise and other high spatial frequencies could be removed by suitable choice of mixing function, when the image is applied on the new background. The mixing function would be derived from the soft mask density. Typically, this could be done by amplifying the soft mask function (for example by multiplying by a scale factor) and then limiting the results to 100%. The wanted image would be multiplied by this new mask value, before being added to the new background image multiplied by the old mask function.

The first and second means, the multiplying means and the subtracting means may be provided by hardware components but will typically be constituted by a suitably programmed computer. For example, the method could be implemented on the Crosfield Studio Image Retouching System.

Where the images are not monochrome, the method will be repeated for each colour component.

BRIEF DESCRIPTION OF THE DRAWINGS

An example of a method and apparatus according to the invention will now be described with reference to the accompanying drawings, in which:

FIG. 3 illustrates an image; and,

FIGS. 4A-4G illustrate the variation of colour content and mask content across a portion of the image shown in FIG. 3, as is explained below.

EMBODIMENT

Figure 1:
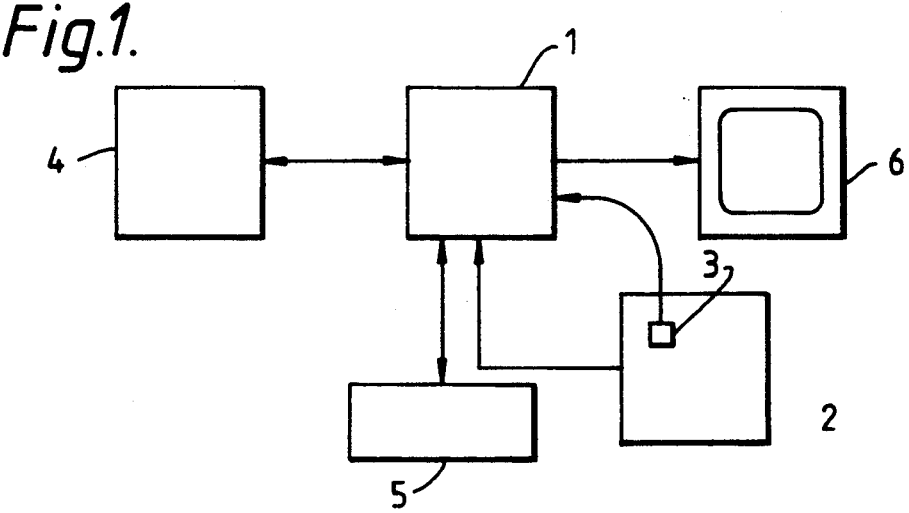
FIG. 1 is a block diagram of the apparatus.

The apparatus has a generally conventional form and comprises a processor 1 to which commands are fed by an operator using a digitising tablet 2 and cursor 3. Digital data defining the colour content of pixels of images is stored in a store 4 and digital data defining masks is stored in a mask store 5. The processor 1 is coupled to a monitor 6 to enable images stored in the store 4 to be viewed.

In this example, it is intended to describe how an image of the form shown in FIG. 3 is processed so as to extract the foreground image of head and shoulders 7 from the background blue sky 11 and green grass 12. The problem with achieving this extraction lies in the fine detail of the hair region 7 where small portions of the blue sky can be viewed. Clearly, it will be very undesirable if the extracted image is inserted back into an image with a differently coloured background for the old background still to be visible.

In this example it is assumed that the hair colour is on average C=60%, M=80%, Y=80% and the sky colour is on average C=40%, M=0%, Y=0% where C is cyan, M is magenta and Y is yellow. FIG. 4A illustrates therefore the variation in cyan in the hair region. FIG. 4B illustrates the corresponding variation in magenta. The variation in yellow is similar to 4B, so is not shown. Thus, pixels which solely define the hair image will have a cyan content of 60% and a magenta content of 80% while pixels defining solely the sky background region will have a cyan content of 40% and a magenta content of 0% (with some noise). There will, however, be some pixels in the image where neither pure hair nor pure sky colour is present and this is indicated by the region noted as "mixture" in FIGS. 4A and 4B.

Figure 2:
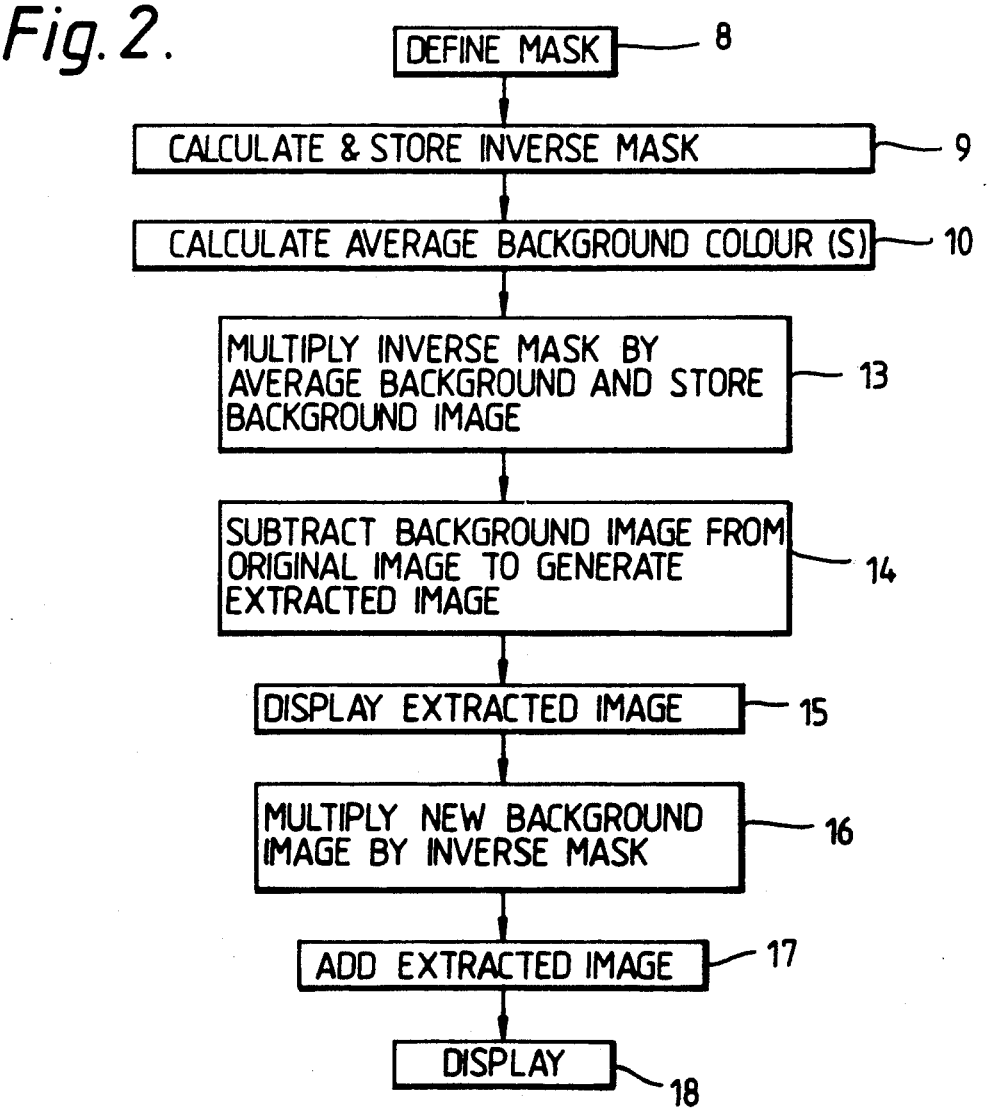
FIG. 2 is a flow diagram illustrating the operation of the apparatus shown in FIG. 1.

In order to extract the foreground image shown in FIG. 3, the operator uses the digitizing tablet 2 and cursor 3 to control the processor 1 to carry out the following steps as illustrated in FIGS. 2 and 3.

To extract the foreground image shown in FIG. 3, the operator intially defines a soft mask. This may be defined using a conventional technique or the technique described in, commonly assigned our U.S. co-pending patent application entitled "Control Data Array Generation Apparatus and Method", application Ser. No. 07/650,492. This soft mask comprises an array of control data pixels, there being one control data pixel corresponding to each original image pixel The content of each control data pixel defines the proportion of the colour components in the corresponding pixel of the original image which is to be extracted. Thus, for the hair/sky region represented in FIGS. 4A and 4B, the soft mask values will have the form shown in FIG. 4C. This indicates that for image pixels solely representing hair it is desired to extract 100% of that pixel data while for image pixels representing solely sky (i.e. undesired background) it is desired to extract 0%. There is then a general gradation in the mixture region. The mask definition step is indicated by step 8 in FIG. 2. The mask is stored in the mask store 5.

In a step 9 the inverse of the stored mask is determined. Where the mask values or densities are normalised to vary between 0 and 1 then the inverse mask is defined as, 1-mask value. This inverse mask is stored in the store 5.

In a step 10 the processor 1 calculates the average background colours in the image. In the case of the FIG. 3 image, there are two background colours: the blue sky region 11 and the green grass region 12.

Each pixel in the inverse mask previously determined is then multiplied by the corresponding average background colour and the resultant background image is stored in the image store 4 (step 13). This background image effectively defines, in the region of the image to be extracted, the amount of undesired background colour. FIG. 4D illustrates the variation of the undesired background cyan in the hair/sky regions where it will be seen that for image pixels defining solely hair then there is no undesired cyan background whereas in regions defining solely sky the entire cyan (40%) is undesired while a general gradation takes place in the mixture region. For magenta and yellow the variation is shown in FIG. 4E.

The processor 1 then subtracts the background image generated in step 13 from the original image so as to generate the extracted image (step 14). This effectively corresponds in the case of the cyan colour component to the subtraction of the trace in FIG. 4D (undesired background cyan) from the trace in FIG. 4A (original image cyan) and in the case of magenta and yellow subtraction of the trace in FIG. 4E (undesired background magenta or yellow) from that in FIG. 4B (original image magenta or yellow). The resultant variations in cyan, and magenta or yellow are shown in FIGS. 4F and 4G respectively. It will be seen from these latter traces that in the mixture region the colour component content falls to 0 for all colour components.

This extracted image can then be displayed after conversion to red, green, blue components on the monitor 6 (step 15) to allow the operator to check that the extraction has worked successfully (step 15). The extracted image is then stored in the image store 4.

If desired, the operator can arrange for the extracted image to be inserted into a new background image also in the store 4. This is achieved by multiplying the new background image by the previously determined inverse mask (step 16) and then adding the extracted image (step 17). The resultant can then be displayed on the monitor 6 (step 18).

As has been mentioned above, instead of the simple addition of step 17, a more complex blending may be necessary with a possible addition of noise to ensure a seamless join in between the images.

I claim:

1. A method of generating a representation of a subsidiary coloured image intially contained within a larger image represented by digital data defining the colour content of pixels of said larger image, the method comprising defining a control data array which defines for at least those pixels in said larger image corresponding to the region containing said subsidiary image the proportion of the image pixel colour which is due to said subsidiary image; determining the average colour in each background region of said larger image where the colour is different from said subsidiary image region; multiplying corresponding areas of the inverse of said control data array by respective ones of said determined average colours to generate a background image; and subtracting said background image from the corresponding region of said larger image so as to generate said representation of said subsidiary image.

2. A method of generating a representation of a subsidiary coloured image initially contained within a larger image represented by digital data defining the colour content of pixels of said larger image, and for inserting said subsidiary image into another image, the method comprising defining a control data array which defines for at least those pixels in said larger image corresponding to the region containing said subsidiary image the proportion of the image pixel colour which is due to said subsidiary image; determining the average colour in each background region of said larger image where the colour is different from said subsidiary image region; multiplying corresponding areas of the inverse of said control data array by respective ones of said determined average colours to generate a background image; and subtracting said background image from the corresponding region of said larger image so as to generate said representation of said subsidiary image; and multiplying data defining the colour content of pixels of said another image by the inverse of said control data array and thereafter combining said representation of the subsidiary image.

3. A method according to claim 2, wherein the combining step comprises adding said representation of the subsidiary image to said multiplied data.

4. Apparatus for generating a representation of a subsidiary coloured image intially contained within a larger image represented by digital data defining the colour content of pixels of said larger image, the apparatus comprising first means for generating and storing a control data array which defines for at least those pixels in said larger image correpsonding to the region containing said subsidiary image the proportion of said image pixel colour which is due to said subsidiary image; second means for determining the average colour in each background region of the larger image where the color is different from said subsidiary image region; multiplying means for multiplying corresponding areas of the inverse of the control data array by respective ones of said determined average colours to generate a background image; and subtraction means for subtracting said background image from the corresponding region of said larger image so as to generate said representation of said subsidiary image.

* * * * *